(12) United States Patent
Matsuyama

(10) Patent No.: US 6,191,505 B1
(45) Date of Patent: *Feb. 20, 2001

(54) ON/OFF CONTROL DEVICE FOR POWER SOURCE UNIT

(75) Inventor: Hirotsugu Matsuyama, Tokyo (JP)

(73) Assignee: NEC Corporation, Tokyo (JP)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 09/175,972

(22) Filed: Oct. 21, 1998

(30) Foreign Application Priority Data

Oct. 21, 1997 (JP) .................................................. 9-288467

(51) Int. Cl.⁷ .................................................. H01H 35/00
(52) U.S. Cl. .......................... 307/130; 307/39; 307/140; 340/636
(58) Field of Search ..................................... 307/125, 126, 307/130, 134, 139, 140, 150, 38–41, 31–35; 340/636

(56) References Cited

U.S. PATENT DOCUMENTS

| | | | |
|---|---|---|---|
| 4,342,953 | * 8/1982 | Collins | 307/150 |
| 4,509,201 | * 4/1985 | Sekigawa et al. | 340/636 |
| 4,906,055 | * 3/1990 | Horiuchi | 340/636 |
| 5,095,308 | * 3/1992 | Hewitt | 340/636 |
| 5,233,227 | * 8/1993 | Kajimoto et al. | 307/38 |
| 5,375,226 | 12/1994 | Sano et al. | 395/500 |
| 5,696,437 | * 12/1997 | Panther et al. | 320/43 |
| 5,705,912 | * 1/1998 | Ichihara | 320/6 |
| 5,859,481 | * 1/1999 | Banyas | 307/150 |
| 5,973,497 | * 10/1999 | Bergk et al. | 340/636 |

FOREIGN PATENT DOCUMENTS

| | | |
|---|---|---|
| 61-288725 | 12/1986 | (JP) . |
| 2-178818 | 7/1990 | (JP) . |
| 5-308731 | 11/1993 | (JP) . |
| 9-261876 | 10/1997 | (JP) . |
| 63-288309 | 11/1998 | (JP) . |

* cited by examiner

Primary Examiner—Fritz Fleming
(74) Attorney, Agent, or Firm—Foley & Lardner

(57) ABSTRACT

A voltage detection circuit 2 detects a voltage of a battery 1 and, when the voltage thus detected is within a tolerable input voltage of a power source unit 5, an on/off signal transmitter circuit 4 allows an on/off signal generator circuit 3 to transmit an on/off signal $S_2$ to the power source unit 5. When the voltage of the battery 1 becomes lower than a lower limit of the tolerable input voltage range of the power source unit 5 due to increase of a power consumption of a load 6 thereof, the on/off signal transmitter circuit 4 transmits an off signal $S_3$ to the power source unit 5 regardless of the on/off signal $S_2$ from the on/off signal generator circuit 3. Thus, it is possible to prevent an erroneous operation of the load due to abnormal operation of the power source unit.

1 Claim, 4 Drawing Sheets

ON/OFF CONTROL DEVICE FOR POWER SOURCE UNIT

BACKGROUND OF THE INVENTION

The present invention claims priority from Japanese Patent Application No. 9-288467 filed Oct. 21, 1997, which is incorporated herein by reference.

1. Field of the Invention

The present invention relates to a control device for a power source unit of a device such as a portable terminal, etc., which includes a battery as a power source thereof.

2. Description of Related Art

In a conventional portable terminal, a voltage detection circuit of a battery is connected to a microprocessor of the portable terminal and the microprocessor controls a power source of the terminal to turn on/off the power source. In such case, there is a possibility of a malfunction of a load due to abnormal operation of the power source unit when the control of the power source unit by the microprocessor fails.

SUMMARY OF THE INVENTION

An object of the present invention is to provide an on/off control device of a power source unit capable of preventing a malfunction of a load due to abnormal operation of the power source unit from occurring.

In order to achieve the above object, an on/off control device of a power source unit according to an embodiment of the present invention comprises an on/off signal generator circuit for generating an on/off signal for on/off controlling the power source unit which supplies a battery voltage to a load, a voltage detection circuit for detecting the battery voltage and determining whether or not the voltage is within a tolerable input voltage range of the power source unit and an on/off signal transmitter circuit for transmitting the on/off signal to the power source unit when the battery voltage is within the tolerable input voltage range of the power source unit and transmitting an off signal to the power source unit when the battery voltage is out of the tolerable input voltage range of the power source unit.

According to another aspect of the present invention, an on/off control device of power source unit comprises an on/off signal generator circuit which generates on/off signals for on/off controlling a plurality of power source units which supply a battery voltage to respective loads, a plurality of voltage detection circuits provided for the respective power source units, each voltage detection circuit detecting the battery voltage and determining whether or not the battery voltage is within a tolerable input voltage range of the corresponding power source unit and on/off signal transmitter circuits provided for the respective power source units, each on/off signal transmitter transmitting the on/off signal to the corresponding power source unit when the battery voltage is within the tolerable input voltage range of the corresponding power source unit and transmitting an off signal to the corresponding power source unit when the battery voltage is out of the tolerable input voltage of the corresponding power source unit.

According to the present invention, the battery voltage that is within the tolerable input voltage range of the power source unit is detected to on/off control the power source unit such that the power source unit is reliably turned off when the battery voltage is lowered.

The voltage detection circuit detects the battery voltage and, when the battery voltage is within the tolerable input voltage range of the power source unit, the on/off signal transmitter circuit allows the on/off signal generator circuit to send the on/off signal to the power source unit. When the battery voltage becomes smaller than the tolerable input voltage range of the power source unit due to an increase of power consumption of the load, the off signal is sent from the on/off signal transmitter circuit to the power source unit regardless of the on/off signal from the on/off signal generator circuit.

BRIEF DESCRIPTION OF THE DRAWINGS

Preferred embodiments of the present invention will be described with reference to the accompanying drawings, in which.

DETAILED DESCRIPTION OF THE PREFERRED EMBODIMENTS

Figure 1:
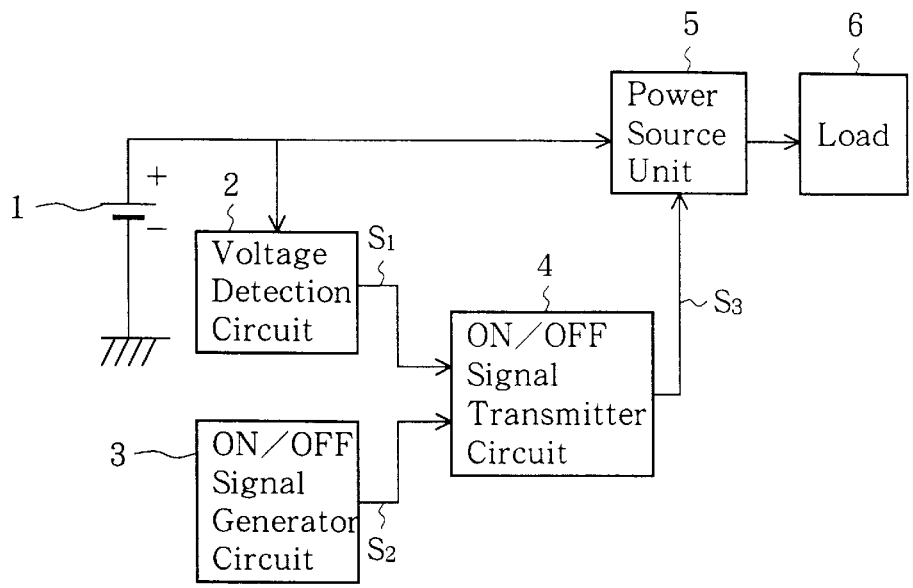
FIG. 1 is a block circuit diagram showing a construction of an on/off control device of a power source unit according to a first embodiment of the present invention.

Referring to FIG. 1, an on/off control device of a power source unit according to the first embodiment of the present invention is constructed with an on/off signal generator circuit 3 for generating an on/off signal $S_2$ for on/off controlling a power source unit 5 which supplies a voltage of a battery 1 to a load 6, a voltage detection circuit 2 for detecting the voltage of the battery 1 and sending a voltage detection signal $S_1$ which is in low level when the battery voltage is within a tolerable input voltage range of the power source unit 5 and is in high level when the battery voltage is out of the tolerable input voltage range, and an on/off signal transmitter circuit 4 for sending the on/off signal $S_2$ from the on/off signal generator circuit 3 to the power source unit 5 as an on/off signal $S_3$ when the voltage detection signal $S_1$ is in high level and sending an off signal $S_3$ to the power source unit 5 regardless of the on/off signal $S_2$ when the output signal of the voltage detection circuit 2 is in low level.

Figure 2:
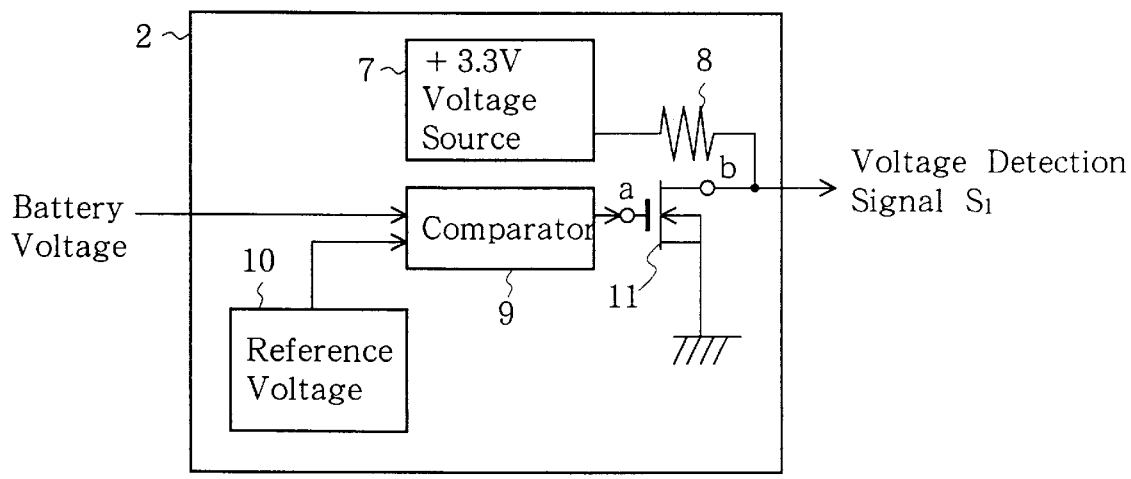
FIG. 2 is a circuit diagram showing an example of a voltage detection circuit shown in FIG. 1.

As shown in FIG. 2, the voltage detection circuit 2 is constructed with a comparator 9, a 3.3V power source 7, a reference power source 10, a resistor 8 and an N-channel MOSFET 11. The comparator 9 compares the battery voltage with a reference voltage value of the reference power source 10 and generates a low level signal when the battery voltage is lower than the reference voltage value. The low level signal is supplied to a gate terminal a of the MOSFET 11 to control a drain terminal b thereof. An output of the drain terminal b of the MOSFET 11 is pulled up by the 3.3V voltage source 7 and the resistor 8 and supplied to the on/off signal transmitter circuit 4 as the voltage detection signal $S_1$. The reference voltage value of the reference power source 10 is predetermined according to a lower limit of the tolerable input voltage of the power source unit 5.

Figure 3:
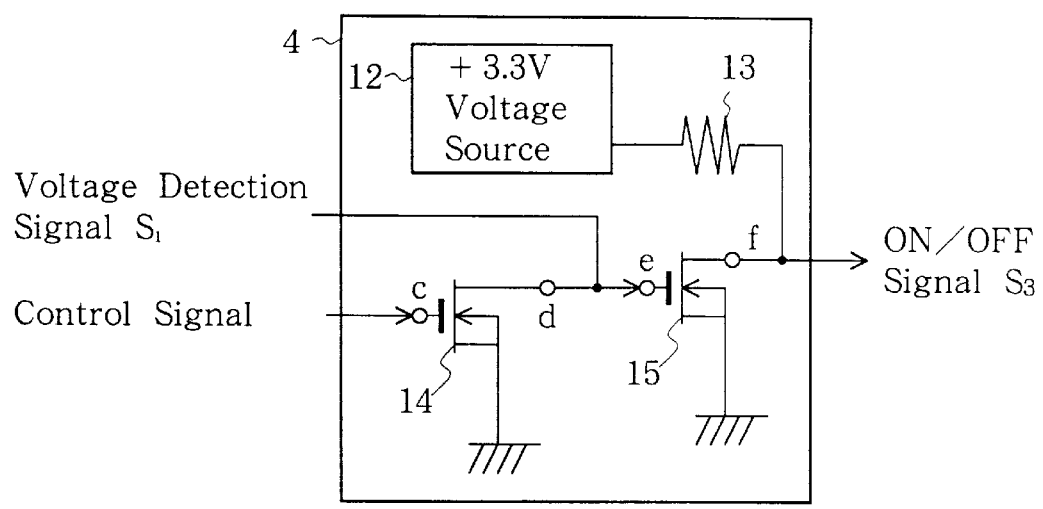
FIG. 3 is a circuit diagram showing an example of an on/off signal transmitter circuit shown in FIG. 1.

FIG. 3 shows a construction of the on/off signal transmitter circuit 4. As shown in FIG. 3, the on/off signal transmitter circuit 4 is constructed with a 3.3V voltage source 12, a resistor 13 and N-channel MOSFET's 14 and 15. The on/off signal $S_2$ from the on/off signal generator circuit 3 is supplied to a gate terminal c of the MOSFET 14 having a drain terminal d connected to a gate terminal e of the MOSFET 15. The gate terminal e of the MOSFET 15 is supplied with the output of the drain terminal d of the MOSFET 14 and the voltage detection signal $S_1$ from the voltage detector circuit 2. An output at a drain terminal f of the MOSFET 15 is pulled up by the 3.3V voltage source 12 and the resistor 13 and supplied to the power source unit 5 as the on/off signal $S_3$.

Now, an operation of the device shown in FIG. 1 will be described with reference to FIGS. 4 and 5.

It is usual, in a case where a device uses a battery such as alkaline battery as its main power source, that a voltage of the main power source is lowered with time for which the device is operated. Further, due to an internal resistance of the battery, the voltage thereof is also lowered by an output current flowing during the operation of the device. In this embodiment shown in FIG. 1, two series-connected alkaline batteries are used as the main power source 1 and the power source unit 5 is turned off when the voltage of the battery 1 becomes lower than 1.5V under assumption that the lower limit of the tolerable input voltage of the power source unit 5 is 1.5V.

Figure 4:
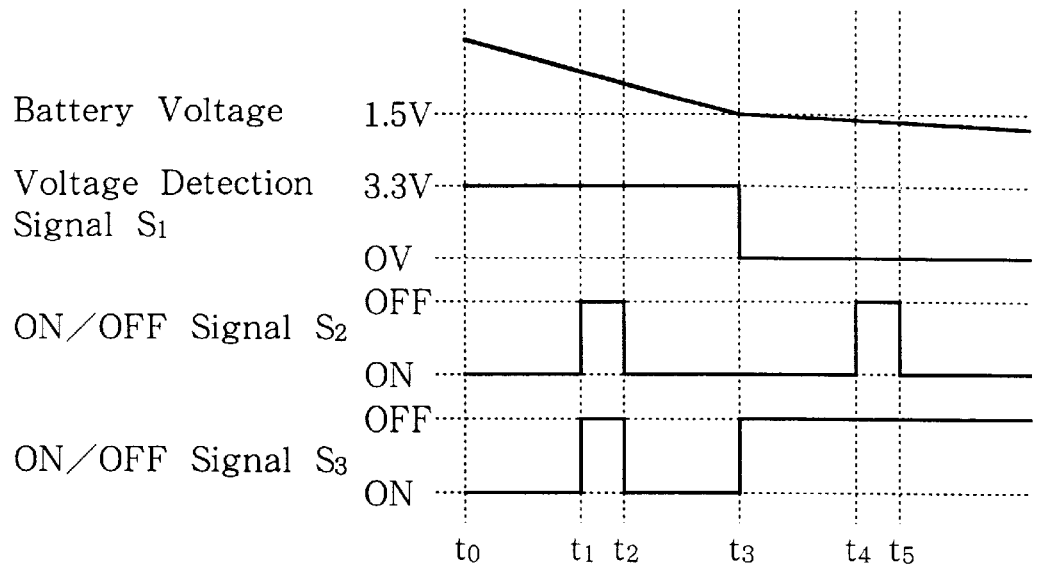
FIG. 4 is a timing chart showing an example of an operation of the on/off control device according to the first embodiment of the present invention.

FIG. 4 is a timing chart showing an example of an operation of the on/off control device according to the first embodiment of the present invention. Assuming that the voltage of the battery 1 is changed as shown in FIG. 4, the voltage detection circuit 2 judges the voltage of the battery 1 as being within the tolerable input voltage range of the power source unit 5 in a period from time instance to $t_0$ time instance $t_3$ and sends the voltage detection signal $S_1$ which is high level (+3.3V) to the on/off signal transmitter circuit 4. In response to the high level voltage detection signal $S_1$, the on/off signal transmitter circuit 4 supplies the on/off signal $S_3$ which is "on" to the power source unit 5 when the signal $S_2$ is "on" and the on/off signal $S_3$ which is "off" to the power source unit 5 when the signal $S_2$ is "off". In a time period from time instance $t_3$ to $t_5$, the voltage detection circuit 2 judges that the voltage of the battery 1 is lower than the lower limit of the tolerable input voltage of the power source unit 5 and sends the voltage detection signal $S_1$ which is low level (0V) to the on/off signal transmitter circuit 4. Therefore, the on/off signal transmitter circuit 4 supplies the on/off signal $S_3$ which is "off" to the power source unit 5 regardless of the on/off signal $S_2$ from the on/off signal generator circuit 3.

Figure 5:
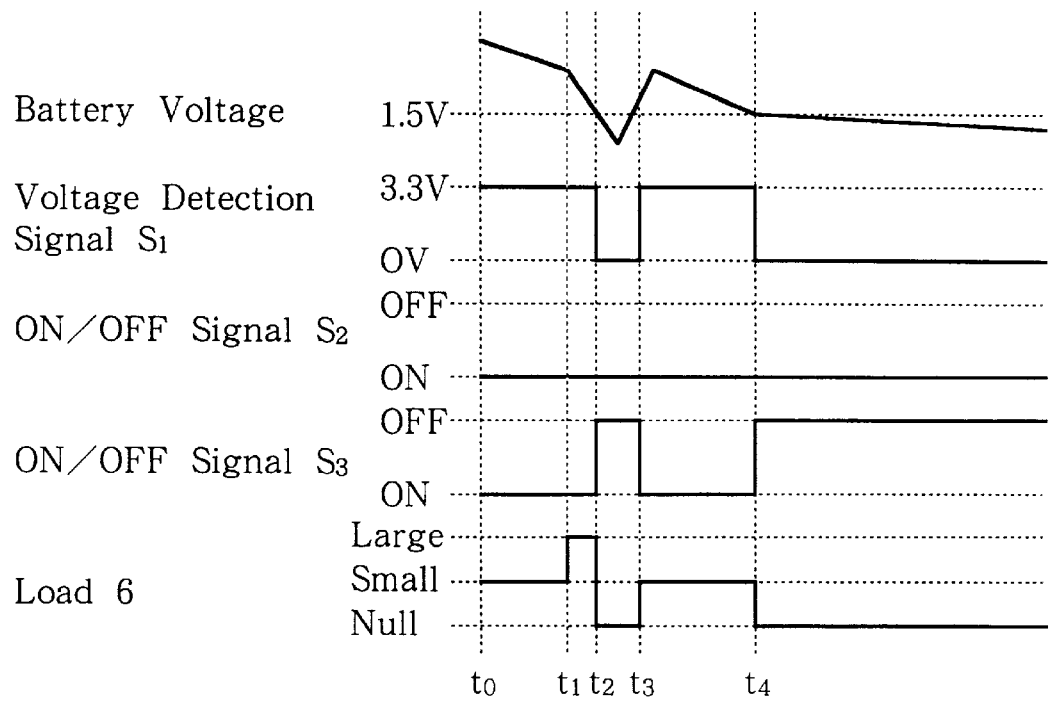
FIG. 5 is a timing chart showing another example of the operation of the on/off control device according to the first embodiment of the present invention.

FIG. 5 is a timing chart showing another example of the operation of the on/off control device. It is assumed that the power consumption of the load 6 is changed from "small" to "large" at a time instance $t_1$ and becomes "null" at time instance $t_2$, and the voltage of the battery 1 is changed as shown. In this case, the voltage detection circuit 2 judges the voltage of the battery 1 as being lower than the lower limit of the tolerable input voltage of the power source unit 5 at a time instance $t_2$ and sends the voltage detection signal $S_1$ of low level (0V) to the on/off signal transmitter circuit 4. Therefore, the on/off signal transmitter circuit 4 supplies the on/off signal $S_3$ which is "off" to the power source unit 5, so that the power source unit 5 is turned off. With the change of the power consumption of the load 6 from "large" to "null", the voltage of the battery 1 becomes larger than the lower limit of the tolerable input voltage of the power source unit 5 at a time instance $t_3$. In a time period from the time instance $t_3$ to a time instance $t_4$, the power consumption of the load 6 is small constantly upon which the voltage detection circuit 2 judges the voltage of the battery 1 as being within the tolerable input voltage range of the power source unit 5 and sends the voltage detection signal $S_1$ which is high level (+3.3V) to the on/off signal transmitter circuit 4. Therefore, the on/off signal transmitter circuit 4 supplies the on/off signal $S_3$ which is "on" to the power source unit 5 when the signal $S_2$ from the on/off signal generator circuit 3 is on. After the time instance $t_4$, the voltage detection circuit 2 judges the voltage of the battery 1 as being lower than the lower limit of the tolerable input voltage range of the power source unit 5 and sends the voltage detection signal $S_1$ which is low level (0V) to the on/off signal transmitter circuit 4. Therefore, the on/off signal transmitter circuit 4 supplies the on/off signal $S_3$ which is "off" to the power source unit 5.

Figure 6:
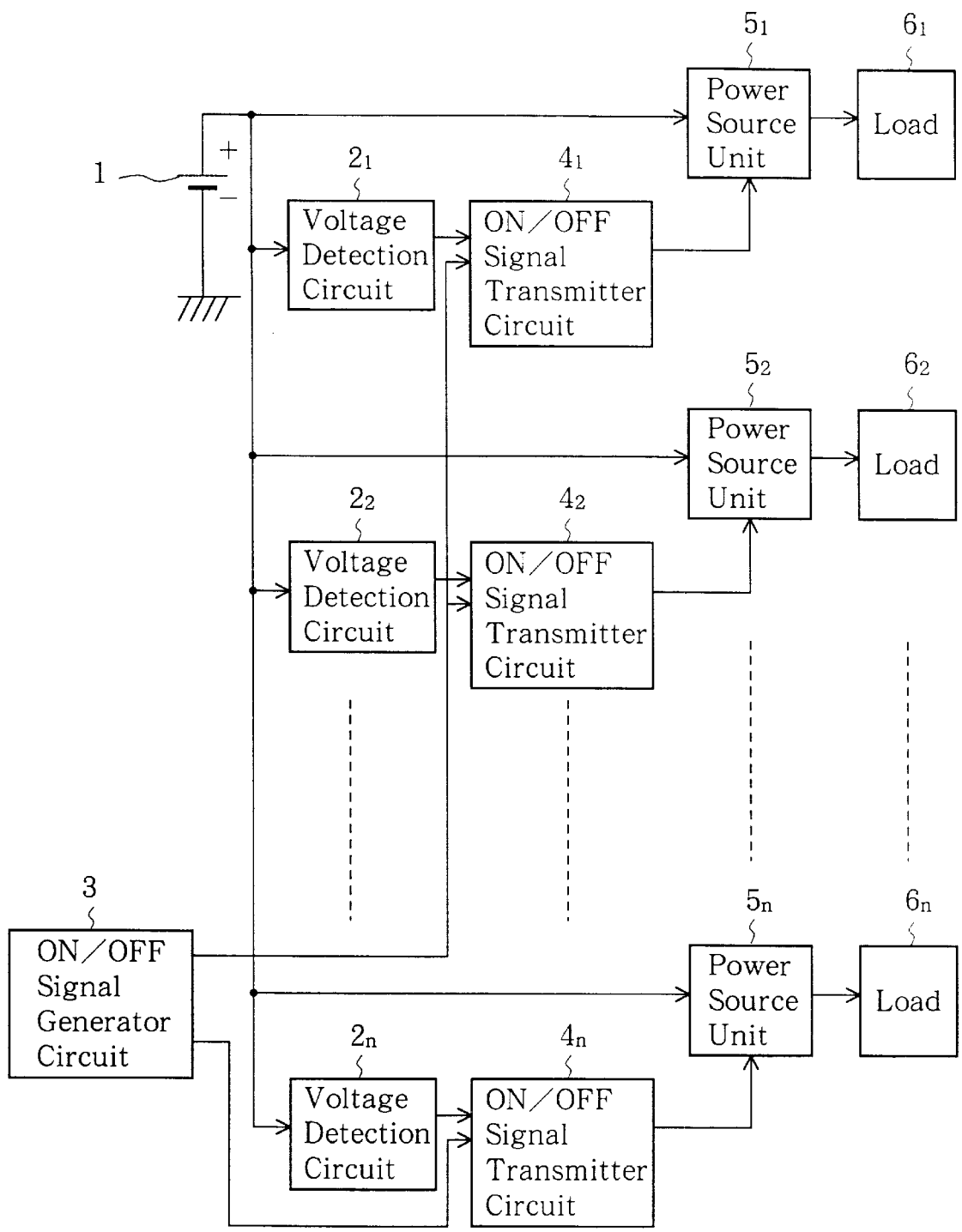
FIG. 6 is a block circuit diagram showing a construction of an on/off control device of a power source unit according to a second embodiment of the present invention.

FIG. 6 shows a control device of a power source unit according to a second embodiment of the present invention. In FIG. 6, a voltage of a single battery 1 is supplied to a plurality (n) of loads $6_1$ to $6_n$ through a corresponding number of power source units $5_1$ to $5_n$, respectively. The control device further includes an on/off signal generator 3, a plurality (n) of voltage detection circuits $2_1$ to $2_n$ and a corresponding number of on/off signal transmitter circuits $4_1$ to $4_n$. That is, n sets each including the voltage detection circuit, the on/off signal transmitter circuit, the power source unit and the load are provided in parallel. The operation of each set is the same as that described with respect to the first embodiment shown in FIG. 1.

As described, the following merits are obtained by the present invention:

(1) Since the power source unit is prevented from being turned on when the battery voltage is lower than the lower limit of the tolerable input voltage of the power source unit, it is possible to prevent a malfunction of the load, a memory destruction, etc., due to abnormal operation of the power source unit from occurring.

(2) Since, when the battery voltage is lowered, the turning-on of the power source unit is performed by the voltage detection circuit regardless of the output of the on/off signal generator circuit, it is possible to turn the power source unit off, even when the on/off control is impossible due to reduction of the battery voltage caused by an abrupt increase of the power consumption of the load.

What is claimed is:

1. A power supply system for supplying a battery voltage to a plurality of loads, comprising:

an on/off signal generator circuit for generating an on/off signal;

a plurality of power source units each supplying the battery voltage to an associated one of the plurality of loads in response to the on/off signal, each of the plurality of loads being associated with a single one of the plurality of power source units;

a plurality of voltage detection circuits, each associated with one of the power source units, each voltage detection circuit supplying a voltage detection signal indicating whether the battery voltage is within an input voltage range of an associated one of the plurality of power source units; and a plurality of on/off signal transmitter circuits, each associated with one of the power source units, each on/off signal transmitter circuit selectively passing the on/off signal to an associated one of the plurality of power source units in response to a voltage detection signal from a voltage detection circuit associated with the associated one of the plurality of power source unit.

* * * * *